(12) United States Patent  
Pogue

(10) Patent No.: US 9,019,269 B1  
(45) Date of Patent: Apr. 28, 2015

(54) INTERACTIVE RENDERING OF BUILDING INFORMATION MODEL DATA

(71) Applicant: Robert Alan Pogue, Davenport, IA (US)

(72) Inventor: Robert Alan Pogue, Davenport, IA (US)

( * ) Notice: Subject to any disclaimer, the term of this patent is extended or adjusted under 35 U.S.C. 154(b) by 77 days.

(21) Appl. No.: 13/694,391

(22) Filed: Nov. 28, 2012

Related U.S. Application Data

(60) Provisional application No. 61/730,016, filed on Nov. 26, 2012, provisional application No. 61/564,093, filed on Nov. 28, 2011.

(51) Int. Cl.  
*G06T 17/00* (2006.01)

(52) U.S. Cl.  
CPC ...................................... *G06T 17/00* (2013.01)

(58) Field of Classification Search  
CPC .................. G06F 17/5004; G06T 2210/04  
USPC .................................................. 345/419, 420  
See application file for complete search history.

(56) References Cited

U.S. PATENT DOCUMENTS

| | | | |
|---|---|---|---|
| 6,922,701 B1 * | 7/2005 | Ananian et al. ...................... 1/1 |
| 2006/0044307 A1 * | 3/2006 | Song .............................. 345/419 |
| 2007/0219645 A1 * | 9/2007 | Thomas et al. .................. 700/29 |
| 2010/0066559 A1 * | 3/2010 | Judelson ................... 340/825.49 |
| 2010/0110071 A1 * | 5/2010 | Elsberg et al. ................ 345/419 |
| 2011/0213480 A1 * | 9/2011 | Zila et al. ......................... 700/98 |
| 2011/0218777 A1 * | 9/2011 | Chen et al. ........................ 703/1 |
| 2011/0276886 A1 * | 11/2011 | Hall et al. ..................... 715/734 |

* cited by examiner

*Primary Examiner* — Maurice L McDowell, Jr.  
(74) *Attorney, Agent, or Firm* — Kenneth J. Lukacher Law Group; R. S. Rosenholm

(57) ABSTRACT

A system, apparatus and method for interactively rendering building information modeling data.

25 Claims, 11 Drawing Sheets

262

INTERACTIVE RENDERING OF BUILDING INFORMATION MODEL DATA

CROSS REFERENCE TO RELATED PATENT APPLICATION(S)

This document is a United States non-provisional utility patent application that claims priority and benefit to U.S. (utility) provisional patent application having Ser. No. (61/730,016), that was filed on Nov. 26, 2012 and that is entitled "INTERACTIVE RENDERING OF BUILDING INFORMATION MODEL DATA", and which is incorporated herein by reference in it's entirety.

This document further claims priority and benefit to U.S. (utility) provisional patent application having Ser. No. 61/564,093, filed on Nov. 28, 2011 and that is entitled "INTERACTIVE RENDERING OF BUILDING INFORMATION MODEL DATA", and which is incorporated herein by reference in its entirety. All of the aforementioned patent applications are incorporated herein by reference in their entirety.

FIELD OF THE INVENTION

An apparatus and system for interactively rendering building information modeling data.

Computer Program Listing Appendix

Enclosed with the specification are two (2) compact discs (Copy 1 and Copy 2) which are identical. The files recorded on each of the attached compact discs (Copy 1 and Copy 2) are associated with an embodiment of a software based application of the invention. The software bases application is designed to interoperate with the Microsoft Windows (Version 7) operating system. These files include ASCII encoded files that are listed within this computer program listing appendix (See below). These ASCII encoded files are stored within hierarchy of file folders having a root file folder named "stadia_source_code_files" at its highest level. All of the ASCII encoded files are each incorporated herein by reference in their entirety.

Each file folder (listed below) was created (written to the write-once compact disc) on Nov. 27, 2012, unless indicated otherwise. Each ASCII file was created on Jun. 24, 2012 unless indicated otherwise. Listed below is each ASCII encoded file that is represented on one line of text including its file name and its size in units of kilobytes.

| Folder/File Name: | Created | Size (kilobytes) |
| --- | --- | --- |
| \stadia_source_code_files\AliExporter\ | | |
| 3dsmaxsdk_preinclude.h | Nov. 20, 2012 | 1 |
| AliExporter.cpp | Nov. 19, 2012 | 8 |
| AliExporter.def | Jun. 24, 2012 | 1 |
| AliExporter.h | Nov. 19, 2012 | 1 |
| AliExporter.vcxproj | Jun. 24, 2012 | 12 |
| ColorData.h | Jun. 24, 2012 | 1 |
| DllEntry.cpp | Jun. 24, 2012 | 4 |
| Document.cpp | Jun. 24, 2012 | 33 |
| Document.h | Jun. 24, 2012 | 1 |
| Face.cpp | Jun. 24, 2012 | 1 |
| Face.h | Jun. 24, 2012 | 1 |
| generateAli.ms | Jun. 24, 2012 | 2 |
| LightData.h | Jun. 24, 2012 | 1 |
| Log.cpp | Jun. 24, 2012 | 1 |
| Log.h | Jun. 24, 2012 | 1 |
| MapData.h | Jun. 24, 2012 | 1 |
| MaterialData.cpp | Jun. 24, 2012 | 1 |
| MaterialData.h | Jun. 24, 2012 | 1 |
| MeshCollection.cpp | Jun. 24, 2012 | 7 |
| MeshCollection.h | Jun. 24, 2012 | 1 |
| MeshData.h | Jun. 24, 2012 | 1 |
| ModelReport.cpp | Jun. 24, 2012 | 2 |
| ModelReport.h | Jun. 24, 2012 | 1 |
| resource.h | Jun. 24, 2012 | 1 |
| Vertice.cpp | Jun. 24, 2012 | 2 |
| Vertice.h | Jun. 24, 2012 | 1 |
| VerticeCollection.cpp | Jun. 24, 2012 | 1 |
| VerticeCollection.h | Jun. 24, 2012 | 1 |
| Writer.cpp | Jun. 24, 2012 | 2 |
| Writer.h | Jun. 24, 2012 | 2 |
| \stadia_source_code_files\AliExporter\Renderer\ | | |
| Logger.cs | Jun. 24, 2012 | 1 |
| Program.cs | Jun. 24, 2012 | 11 |
| Renderer.csproj | Jun. 24, 2012 | 3 |
| \stadia_source_code_files\AliExporter\Renderer\Properties\ | | |
| AssemblyInfo.cs | Jun. 24, 2012 | 2 |
| \stadia_source_code_files\StadiaAddIn\ | | |
| bake_image.png | Mar. 26, 2012 | 1 |
| DocumentMetadataManager.cs | Mar. 26, 2012 | 5 |
| Exporter.cs | Mar. 26, 2012 | 9 |
| NewDemoForm.cs | Mar. 26, 2012 | 1 |
| NewDemoForm.designer.cs | Mar. 26, 2012 | 10 |
| NewDemoForm.resx | Mar. 26, 2012 | 8 |
| NoCamerasException.cs | Mar. 26, 2012 | 1 |
| Stadia.addin | Mar. 26, 2012 | 1 |
| StadiaAddIn.csproj | Mar. 26, 2012 | 5 |
| StadiaRibbonUI.cs | Mar. 26, 2012 | 15 |
| Uploader.cs | Mar. 26, 2012 | 2 |

-continued

| Folder/File Name: | Created | Size (kilobytes) |
|---|---|---|
| WindowHandle.cs | Mar. 26, 2012 | 1 |
| \stadia_source_code_files\StadiaAddIn\Properties\ | | |
| AssemblyInfo.cs | Mar. 26, 2012 | 2 |
| \stadia_source_code_files\StadiaAddIn\references\ | | |
| bake_image.ico (image) | Mar. 26, 2012 | 2 |
| bake image.png (image) | Mar. 26, 2012 | 1 |
| Ionic.Zip.dll (binary) | Mar. 26, 2012 | 452 |
| Microsoft...ageClient.dll (binary) | Mar. 26, 2012 | 358 |
| Stadia...Common.dll (binary) | Mar. 26, 2012 | 14 |
| \stadia_source_code_files\StadiaAddIn\packages\ | | |
| \stadia_source_code_files\UnityProject\ | | |
| \stadia_source_code_files\UnityProject\Assets\ | | |
| AudioManager.asset | Jun. 24, 2012 | 5 |
| DynamicsManager.asset | Jun. 24, 2012 | 5 |
| EditorBuildSettings.asset | Jun. 24, 2012 | 5 |
| EditorSettings.asset | Jun. 24, 2012 | 5 |
| InputManager.asset | Jun. 24, 2012 | 5 |
| NavMeshLayers.asset | Jun. 24, 2012 | 9 |
| NetworkManager.asset | Jun. 24, 2012 | 5 |
| ProjectSettings.asset | Jun. 24, 2012 | 5 |
| QualitySettings.asset | Jun. 24, 2012 | 12 |
| TagManager.asset | Jun. 24, 2012 | 6 |
| TimeManager.asset | Jun. 24, 2012 | 5 |
| \stadia_source_code_files\UnityProject/ProjectSettings\ | | |
| DoorScript.cs | Jun. 24, 2012 | 2 |
| Scene.unity (binary) | Jun. 24, 2012 | 6 |
| \stadia_source_code_files\UnityProject\ProjectSettings\Assets | | |
| \stadia_source_code_files\UnityProject/ProjectSettings\Assets\CharacterController\ | | |
| First Person Controller.prefab | Jun. 24, 2012 | 36 |
| \stadia_source_code_files\UnityProject\ProjectSettings\Assets\CharacterController\Sources\ | | |
| ApplicationBehavior.cs | Jun. 24, 2012 | 2 |
| CameraLocation.cs | Jun. 24, 2012 | 1 |
| CameraLocationHolder.cs | Jun. 24, 2012 | 1 |
| EnableAllBehaviorOnStart.cs | Jun. 24, 2012 | 1 |
| Motor.cs | Jun. 24, 2012 | 3 |
| PositionController.cs | Jun. 24, 2012 | 2 |
| SmoothMouseLook.cs | Jun. 24, 2012 | 2 |
| \stadia_source_code_files\UnityProject\ProjectSettings\Assets/Editor\ImageEffects\ | | |
| Antialiasing...Effect.js | Jun. 24, 2012 | 5 |
| BloomAndLenseFlares.js | Jun. 24, 2012 | 11 |
| ColorCorr...Curves.js | Jun. 24, 2012 | 5 |
| EdgeDet...Normals.js | Jun. 24, 2012 | 5 |
| Tonemapping.js | Jun. 24, 2012 | 7 |
| Blend.shader | Jun. 24, 2012 | 3 |
| BlendOneOne.shader | Jun. 24, 2012 | 1 |
| BrightPassFilter.shader | Jun. 24, 2012 | 1 |
| LenseFlareCreate.shader | Jun. 24, 2012 | 2 |
| DLAA.shader | Jun. 24, 2012 | 11 |
| Apply.shader | Jun. 24, 2012 | 2 |
| Adaptation.shader | Jun. 24, 2012 | 2 |
| MinMaxRed..ion.shader | Jun. 24, 2012 | 2 |
| Luminance.shader | Jun. 24, 2012 | 5 |
| ColorCorr...rves.shader | Jun. 24, 2012 | 3 |
| ColorCorr...ffect.shader | Jun. 24, 2012 | 1 |
| Color...mp.png (image) | Jun. 24, 2012 | 11 |
| EdgeDe...rmals.shader | Jun. 24, 2012 | 5 |
| HardEdges.shader | Jun. 24, 2012 | 5 |
| Tonemapper.shader | Jun. 24, 2012 | 10 |
| GrayscaleEffect.shader | Jun. 24, 2012 | 1 |
| Gray...Ramp.png (image) | Jun. 24, 2012 | 1 |
| PostEffectsBase.js | Jun. 24, 2012 | 6 |
| PostEffectsHelper.js | Jun. 24, 2012 | 6 |
| \stadia_source_code_files\UnityProject\ProjectSettings\Assets/Textures\ | | |
| \stadia_source_code_files\UnityProject\ProjectSettings\Editor\ | | |
| BuildScene.cs | Jun. 24, 2012 | 32 |
| DebugScene.cs | Jun. 24, 2012 | 2 |
| Log.cs | Jun. 24, 2012 | 1 |
| Materials.cs | Jun. 24, 2012 | 5 |
| MenuItems.cs | Jun. 24, 2012 | 1 |
| Reader.cs | Jun. 24, 2012 | 5 |
| ReaderData.cs | Jun. 24, 2012 | 3 |
| \stadia_source_code_files\UnityProject\ProjectSettings\Resources/ | | |
| Sky.cubemap (cubemap) | Jun. 24, 2012 | 1,359 |
| \stadia_source_code_files\UnityProject\ProjectSettingsAScene\ | | |
| BeastSettings.xml | Jun. 24, 2012 | 3 |
| \stadia_source_code_files\UnityProject\ProjectSettings\Shaders\ | | |
| DiffuseColor.shader | Jun. 24, 2012 | 2 |

| Folder/File Name: | Created | Size (kilobytes) |
|---|---|---|
| DiffuseTexture.shader | Jun. 24, 2012 | 2 |
| TransparentColor.shader | Jun. 24, 2012 | 1 |
| TransparentReflective. shader | Jun. 24, 2012 | 1 |

BACKGROUND OF THE INVENTION

Building information model (BIM) data is designed to model the design (architecture) of a large structure such as of a building, house, bridge etc. BIM data is typically stored in a database of information regarding BIM elements and relationships between those BIM elements. BIM elements can be walls, roofs, windows, doors, floors, rooms etc. The relationships between elements can include a relationship defining that a door element and a window element are each located as a portion of a wall element, which is located adjacent to and above a particular floor element etc.

The discussion above is merely provided for general background information and is not intended to be used as an aid in determining the scope of the claimed subject matter.

BRIEF DESCRIPTION OF THE INVENTION

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In one aspect, the invention provides a system for transforming building information modeling data into a video-like interactive rendering. In some embodiments, the interactive rendering is provided at a rate of at least 30 image frames per second. In some embodiments, the interactive rendering is provided with visual effects based upon the simulation of artificial lighting. In some embodiments, the interactive rendering is provided with visual effects based upon solar light and its orientation with respect to a BIM structure being modeled.

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, and the emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
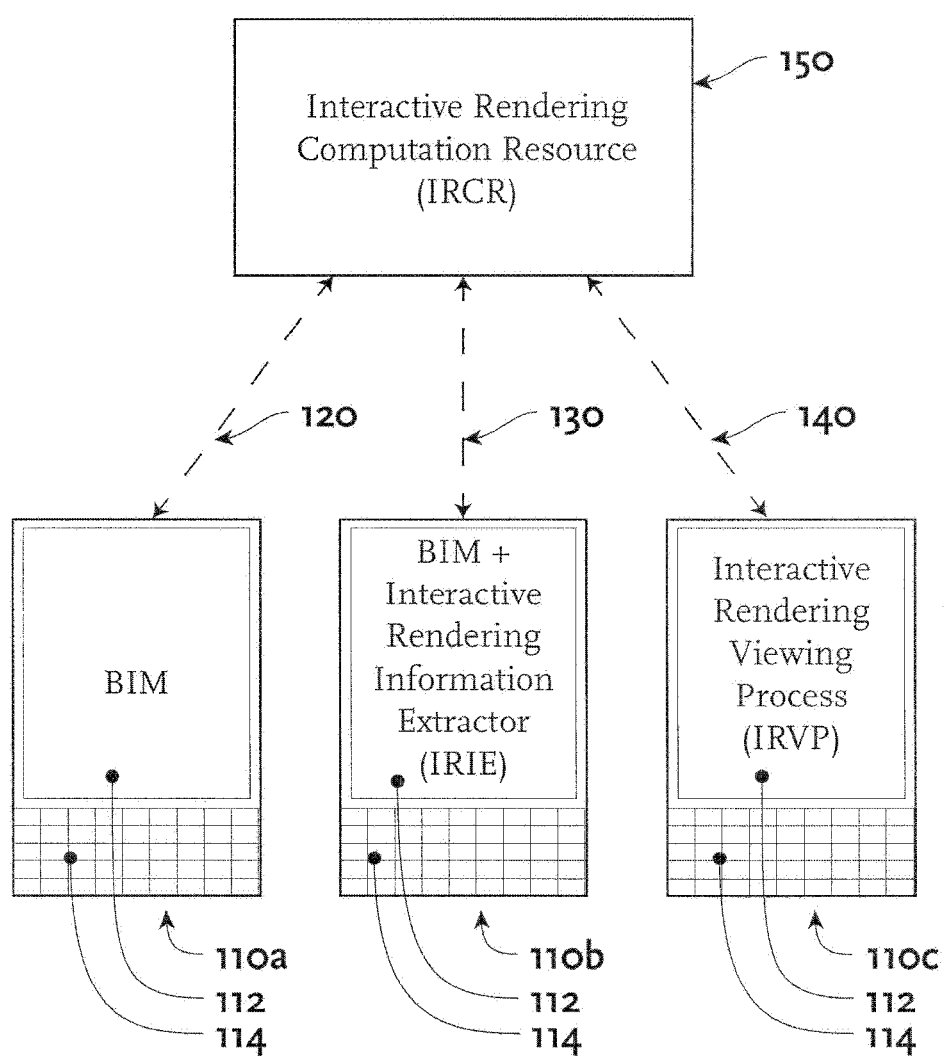
FIG. 1 is a diagram illustrating interoperation between an interactive rendering computation resource (IRCR), a front end computer providing a user interface for building information modeling (BIM) software, and a front end computer running an interactive rendering (IR) simulation.

FIG. 1 is a diagram illustrating a front end computer 110*a* and 110*c* configured with hardware and software to enable a user to interact with and exercise building information modeling (BIM) software. A front end computer 110*a* is transformed to a front end computer 110*b* by an additional installation of a software component termed the interactive rendering information extractor (IRIE) (See FIG. 3A). The IRIE, also referred to herein as a data extractor, enables interoperation between the front end computer 110*b* and software executing within a computing environment provided by the interactive rendering computation resource (IRCR) 150. Computing device 110*c* downloads and executes an interactive rendering viewing program (process) (IRVP) 440, also referred to herein as the interactive rendering viewer program (process) (IRVP) 440. This program includes dynamic rendering instructions and at least some data (dynamic rendering data), provided via computation by software executing within the computing environment of the IRCR 150.

The dynamic rendering instructions are included within and/or accessible by the IRVP 440 while it is executing. The dynamic rendering data is also included within and/or accessible by the IRVP 440 while it is executing. Regardless of specific embodiment and programming implementation, the dynamic rendering instructions and dynamic rendering data interoperate with the IRVP 440 while it is executing.

The dynamic rendering instructions and data that are provided by the IRCR 150 collectively enable the computing device 110*c* to perform interactive rendering (IR) of BIM data 380 stored on front end computers 110*a*-110*b*. In this embodiment, the IRCR 150 is accessible over a network and is also characterized as being a set of network accessible computing resources. Example source programming code for an embodiment of the IRIE (See 310 of FIG. 3B) is found within source code file named Exporter.cs (See Lines 18-150) as the public methods of the Exporter class.

As shown, the front end computers 110a,110b, 110c provide a graphic user interface 112 and input devices including a keyboard 114 and pointing device, (mouse or touch screen) (not shown) that are employed by a user to interact with software, including for example, building information modeling (BIM) software. The computing device 110c provides a means for the user to interact with the interactive rendering viewer program (IRVP). In this embodiment, computing device 110c provides a keyboard and screen pointing device (mouse or touch screen) for user input.

As described herein, the front end computers 110a-100b represent the same computer being in different stages of software installation. Additional software is installed onto the front end computer 110b relative to the software installed onto the front end computer 110a. The additional software provides interactive rendering information extraction (IRIE) functionality to the front end computer 110b that does not exist on the first front end computer 110a. Computing device 110c may be the same computer as 110a and 110b, or be a separate and/or different type of computing device utilizing different hardware, different operating system, and/or different input devices. Computing device 110c executes the interactive rendering viewing program (IRVP) (See 440 of FIG. 4B) in accordance with interactive user input. The IRIE executing on computer 110b, the IRCR 150, and the IRVP executing on computer 110c are included within embodiments of the subject matter of the invention.

In a first embodiment of the invention, each of the front end computers 110a, 110b, and 110c are configured with a Windows operating system software, such as Windows 7 operating software for example, and Autodesk Revit Architecture Suite application software, provided by the Autodesk Inc. of San Rafael, Calif. For ease of discussion herein, the front end computer 110c can be considered the same as front end computer 110a-110b with respect to its hardware configuration, however front end computer 110c being in a different stage of software installation given that it has the IRVP software installed within it.

In a first use scenario, the first front end computer 110a communicates with an interactive rendering computation resource (IRCR) 150 via a first communications channel 120 and the second front end computer 110b communicates with the IRCR 150 via a second communications channel 130 and the third front end computer 110c communicates with the IRCR 150 via a third communications channel 140.

In this embodiment, the IRCR 150 is accessible as a web service available to an internet connected device. In other embodiments, the IRCR 150 could reside on a personal computer, such as for example, 110b, or could reside on another type of network, such as a private network upon which the front end computer 110b also resides and has communication access to.

In this embodiment, each of the communications channels 120 and 130 and 140 support HTTP traffic via the Internet. The IRCR 150, provides an interactive rendering viewing program (IRVP) to be available for download at a uniform resource locator (URL), based upon particular preexisting BIM data. Computing device 110c is configured for and capable of executing the dynamic and interactive rendering (IR) functionality provided the IRVP software that would be otherwise unavailable from BIM software alone. The term "dynamic rendering", herein refers to video like visual output. The term "interactive rendering", herein refers to visual output that is controlled and altered by user input in real time.

Figure 2A:
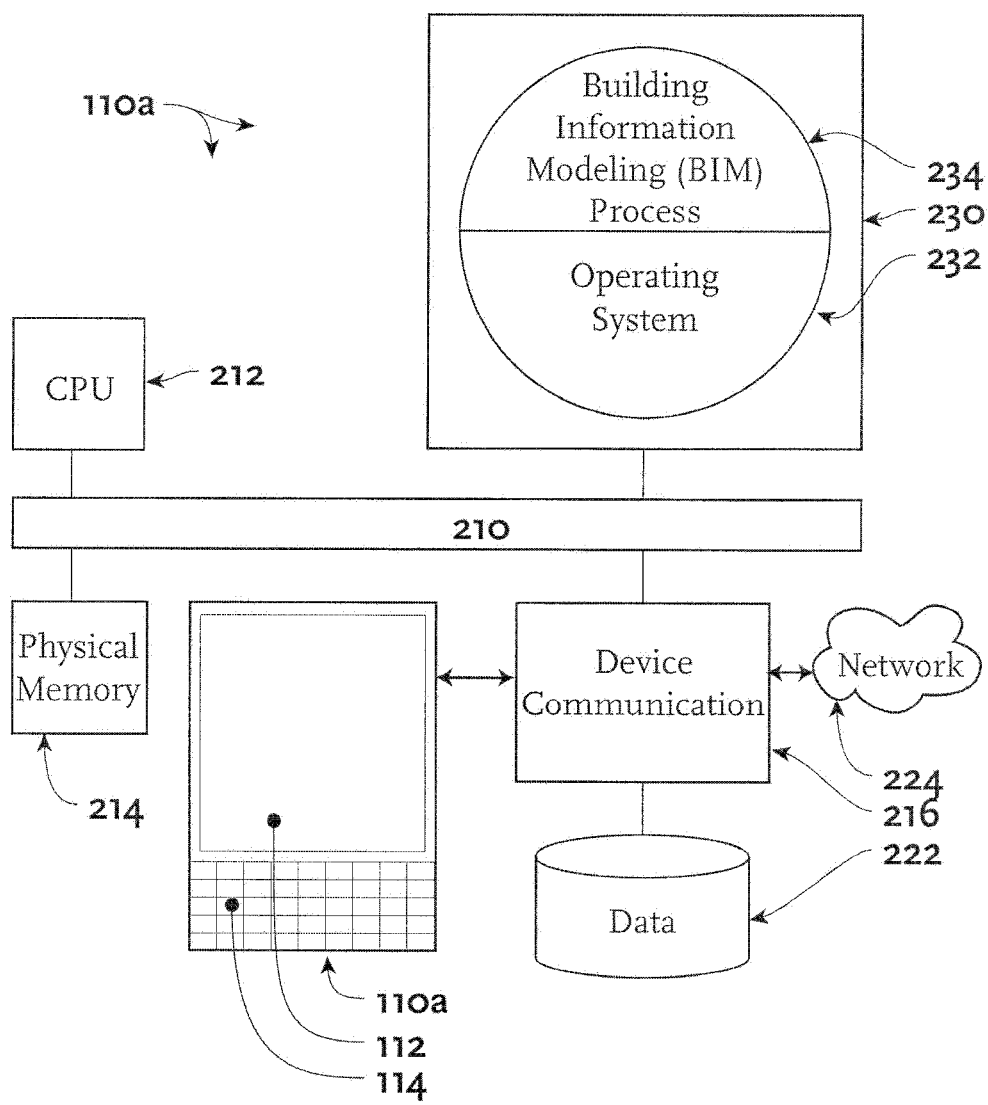
FIGS. 2A-2C illustrate hardware and software of the front end computer, a sectional perspective view of a first building in the BIM software executing on the front end computer, and a floor plan of a second building being modeled by the BIM software executing on the front end computer 110*a*.

FIG. 2A is a diagram illustrating hardware and software of the front end computers 110a, 110b and 110c. As shown, the front end computer includes a central processing unit (CPU) 212, physical memory 214 and device communication hardware 216 that are attached to a system bus 210. The device communication hardware 216 interfaces with the graphics user interface screen 112 and input devices 114 of the front end computers 110a and 110b and 110c that can execute the (BIM) application software 234, and accesses stored data 222 from a non-volatile data storage device, and optionally interfaces with a communications network 224.

The operating system 232 assigns physical memory 214 as virtual memory 230. Within the virtual memory 230 there resides an operating system 232 and building information modeling (BIM) application software 234. Note that the third front end computer 110c, is not required to have installed BIM software.

Note that the IRCR 150 is offered as part of an online accessible service that is provided to architects and other types of design personnel. In some embodiments and use scenarios, an application for registration to enroll with this service can be accessed and submitted via the Internet.

Figure 2B:
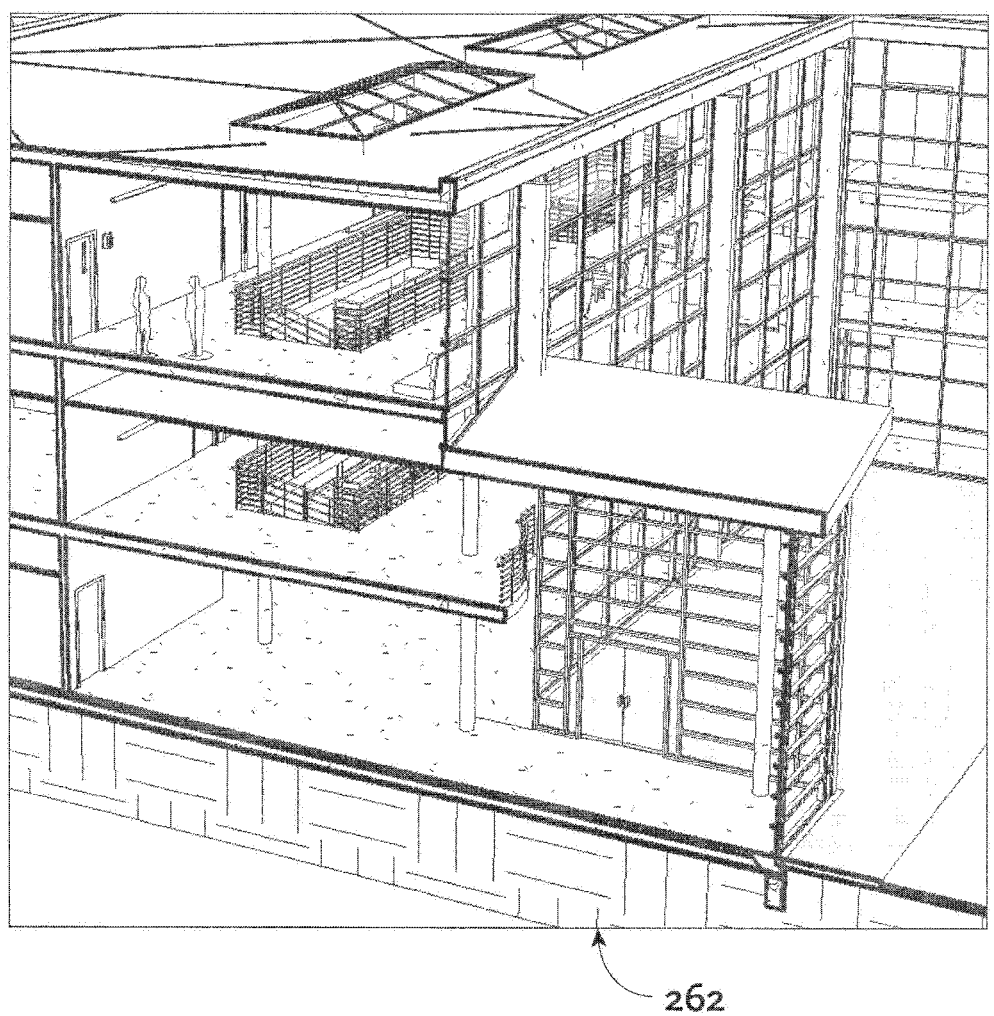

FIG. 2B illustrates a sectional perspective view of a first building being modeled by the BIM software executing on the front end computer 110. As shown, a building is viewed from a horizontal perspective 262. The building is displayed as if it were vertically truncated such that some of the internal structural features of the building, such as internal doors and walls and stairwells on three floors are visible as if an outer wall was not present.

Figure 2C:
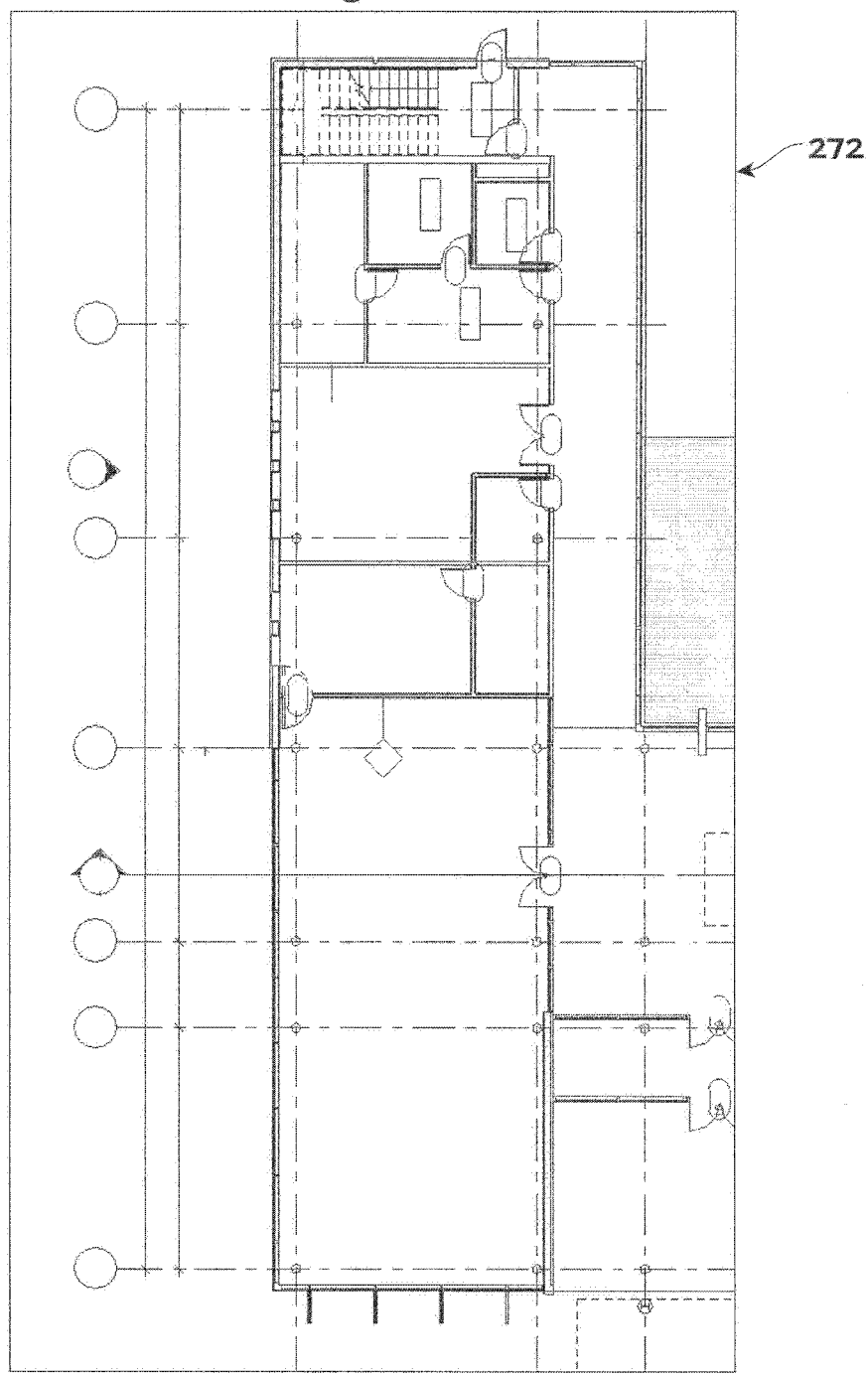

FIG. 2C illustrates a top-down view of a floor plan 272 of a second building being modeled by the BIM software executing on the front end computer 110. As shown, a floor plan includes a cafeteria and a conference room that are accessible via a corridor. This view is a diagrammatic view of a floor's spatial layout. BIM software is generally capable of providing graphic representations of BIM data in a diagrammatic format consistent with architectural convention. For example, floor plans, building elevations, sections, and wireframe three dimensional views.

Figure 3A:
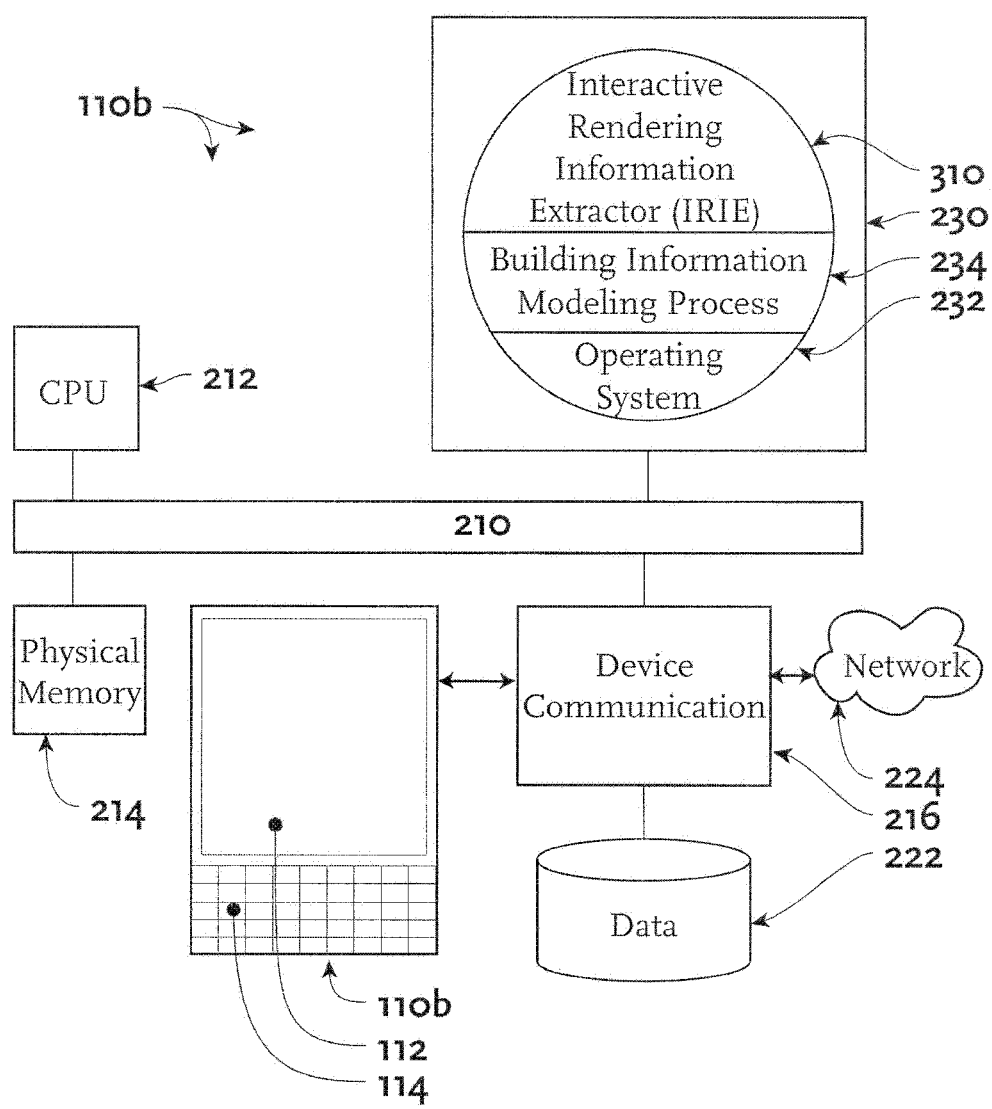
FIGS. 3A-3B illustrate a hardware and software of the front end computer 110*b* and operation of the interactive rendering information extractor (IRIE) 310 software as installed onto the front end computer 110*b*.

FIG. 3A is a diagram illustrating a hardware and software of the front end computer 110b. As shown, like that of front end computer 110a, the front end computer 110b includes a central processing unit (CPU) 212, physical memory 214 and device communication hardware 216 that are attached to a system bus 210. The device communication hardware 216 interfaces with the graphics user interface screen 112 and input devices 114 of the front end computer 110b, and accesses stored data 222 from a non-volatile data storage device and interfaces with a communications network 224.

The operating system 232 assigns virtual memory 230 to physical memory 214. Within the virtual memory 230 there resides an operating system 232 and building information modeling (BIM) application software 234.

Unlike the front end computer 110a, the virtual memory 230 of the front end computer 110b further includes an interactive rendering information extractor (IRIE) 310. In some embodiments, the IRIE 310 is implemented as a software add-on component, also referred to as a plug-in component. This software add-on component 310 is included within additional software of the second front end computer 110b that is absent from the front end computer 110a, as described in association with FIG. 1.

In one embodiment, upon subscribing to an interactive rendering service provided in association with the IRCR 150, the interactive rendering (IR) information extractor (IRIE) software component 310 is downloaded to (installed onto) the front end computer 110a and loaded into virtual memory 230 as an add-on component to the BIM software 234. As a result of installing the IRIE component 310, the first front end computer 110a transitions to a next stage of software installation and transitions to constituting the second front end computer 110b.

When incorporated with and added onto the BIM software 234, the IRIE software 310 provides user interface functionality that supplements the user interface functionality provided by the BIM software. When a user of the BIM software 234 desires an interactive rendering of BIM data, the user activates a user interface command via a keyboard or mouse command that causes the IRIE software 310 to extract information from the BIM data included within the stored data 222, and to communicate the extracted information to the IRCR 150.

In some embodiments, the IRIE software 310 compresses the extracted information and transmits extracted data to the IRCR 150 using the HTTP protocol. Upon receipt of the extracted information, the IRCR 150 schedules for processing and processes the extracted information to generate an interactive rendering viewing program (IRVP) and associated run-time accessible data, that collectively correspond to the BIM data of the front end computer 110b. In other embodiments, the run-time accessible data is embedded in the IRVP program. The IRVP is designed to provide both interactive and dynamic rendering of the structure modeled by the BIM data.

Figure 3B:
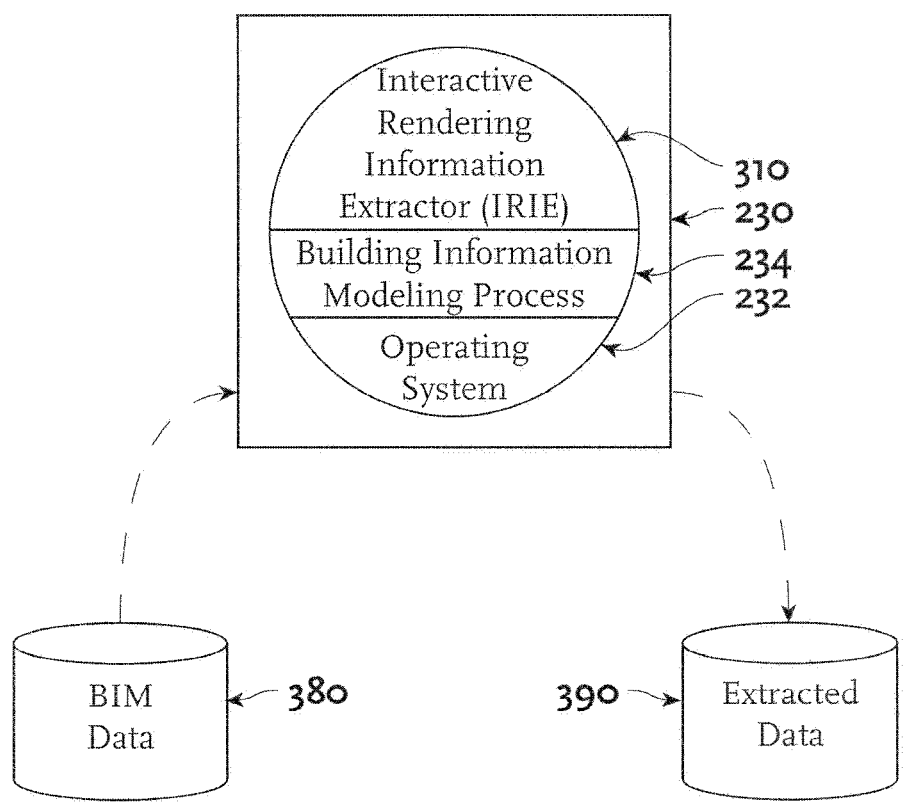

FIG. 3B illustrates operation of the interactive rendering information extractor (IRIE) 310 as installed onto the front end computer 110b. As shown, the IRIE 310 processes BIM data 380 by reading, identifying and selectively copying (extracting) BIM data 380 that is relevant to creating an interactive and dynamic rendering of the structure being modeled by the BIM data 380.

The IRIE software 310 selectively copies some of the BIM data 380 and in some circumstances, may create new data, that is not present in exact form within the BIM data 380. The new data encodes information gleaned from the BIM data 380 and that is useful towards generating software and data for providing an interactive and dynamic rendering of the structure being modeled by the BIM data 380. The newly extracted (copied and/or created) data for interactive and dynamic rendering is referred to herein as interactive rendering (IR) (extracted) data 390, and also referred to herein as extracted rendering data 390 or extracted data 390. Example source programming code for writing and reading the extracted rendering data is found in source code files named Exporter.cs, GenerateAli.ms, and Document.cpp.

In a first embodiment, extraction is performed, in part, by generation of a file having a name suffixed with (.FBX), referred to herein as an .FBX file. The FBX file is a standard formatted file that is created via software provided by Autodesk Revit Architecture Suite.

In addition to the .FBX file, files having names with suffixes other than .FBX and that are suffixed with (.doors, .cameras. and .info) are created to further provide information that is useful for supporting interactive rendering of the structure modeled by the BIM data 380, but where such information is not provided within the .FBX file.

Note that the Autodesk Revit BIM software can produce high quality and almost photo-realistic images of BIM modeled structure using a ray tracing image rendering technique. Although the ray tracing technique can provide a high quality image, it also requires substantial computational resources to produce just one image. With respect to computational resources of personal computers that are available at the time of this writing, a commercially available front end personal computer would typically require a substantial portion of one hour to compute and render a detailed image of a BIM modeled structure, that incorporates high quality materials and realistic lighting effects.

Consequently, the production of a dynamic (video like) animation of a BIM modeled structure using the ray tracing technique, requiring at least 30 image frames per second therefore limiting image construction to 33 milliseconds per image frame, is not known to be practical using currently commercially available personal computers. Note that providing a video like animation, regardless of the actual rate of image frames per second that is provided within the animation, is not an interactive rendering. Unlike an interactive rendering, an animation does not receive and does not process input from a viewer in order to control and alter, for example change the location and/or direction of a virtual camera in real time as provided by an interactive rendering.

As a result, an animation can be entirely pre-computed prior to a display of the animation to a viewer (user) of the animation because the location and direction of the camera over time can be known prior to the display and computation of any image within the animation. However, an interactive rendering is not entirely pre-computed prior to viewing by a viewer (user), given that the location and direction of the camera over time is not known until receiving real time input from the viewer (user) during the display of the interactive rendering.

Figure 4A:
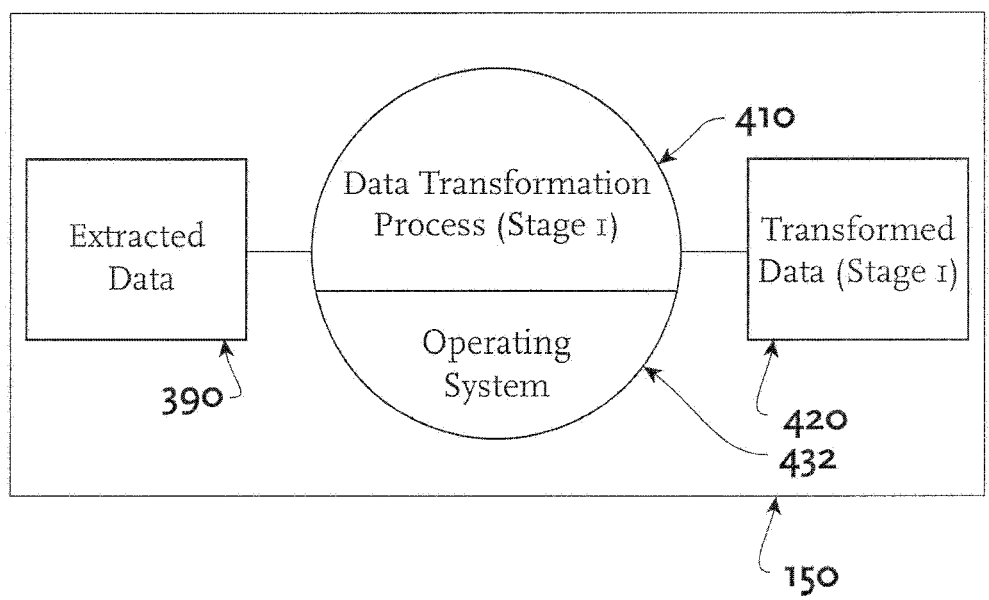
FIGS. 4A-4B illustrate a first stage and a second stage of transformation of the interactive rendering (IR) (extracted) data 390 obtained from the front end computer 110*b*.

FIG. 4A illustrates a first stage of transformation of the extracted (interactive) rendering (IR) data 390 obtained from the front end computer 110b. The interactive rendering computation resource (IRCR) 150 receives the extracted (interactive) rendering (IR) data 390 from the interactive rendering information extractor (IRIE) software 310 executing within the front end computer 110b. In this embodiment, the IRIE 310 stores the extracted (IR) data 390 into files that are compressed and transmitted from the front end computer 110b to the IRCR 150 via the Internet.

As shown, a first transformation process 410 implemented from software executing within the computing environment and hardware of the interactive rendering computation resource (IRCS) 150, un-compresses, inputs and processes the IR data 390 and outputs transformed extracted (IR) data 420, also referred to as first stage transformed data 420. The transformation performed by this software 410 is referred to as the first stage of the (IR) (extracted data) transformation process (Stage 1) 410. Example source programming code for an embodiment of the data transformation (Stage 1) is found in source code file named Document.cpp (See Lines 30-721). The operating system 232 and hardware employed within the IRCR 150 is not necessarily the same type of operating system 232 employed within the from end computer 110a-110b.

In this embodiment, interactive rendering is to be performed by employing software tools of the Unity game development environment which is supplied by Unity Technologies of San Francisco, Calif. Within this environment, a game is referred to as including one or more scenes which each have a set of associated objects. The process described herein transforms building information modeling (BIM) elements and their relationships into game scenes and game objects.

In this embodiment, the transformed extracted (IR) data 420 is processed from the extracted (IR) data 390, output and packed into a file having a name with an .ALI suffix, and is referred to as an .ALI file. The transformed extracted (IR) data 420 is ordered and packed into the .ALI file. Source code describing the serialization algorithms are located within the Writer.h and Writer.cpp source code files. Data serialized and written to a file is herein referred to as a structured file format. The transformed extracted (IR) data 420 is represented as a series of data items (transactions) which will be further processed by other software executing on the IRCR 150 to create interactive rendering program including customized software instructions and data that are compatible with the Unity game development environment. This program provides an interactive and dynamic visual environment for control and navigation by a viewer (user).

In this embodiment, a "3ds Max" utility program that is supplied by Autodesk, is employed to read and process the .FBX file residing within the IR (extracted) data 390. An "ALIExporter" procedure, which is constructed as a dynamically linked library (.dll), is linked as a custom exporter to the 3ds Max utility program. While linked with the 3DSMAX utility program, the ALIExporter procedure constructs the .ALI file within the first stage transformed IR data 420.

The ALI Exporter procedure searches the extracted IR data 390 which was extracted from BIM data 380 representing BIM elements and their relationships, and identifies data that can be used to construct a game scene or game objects. Within the Unity game environment, game objects include materials, light sources, cameras, meshes.

A mesh is composed of triangles, each triangle being defined by exactly three vertices, which are points in three dimensional space. When a mesh contains multiple materials, the triangles are grouped by material, and each group is referred to as a submesh. For example, a bathroom sink can be modeled with about 500 triangles. Most of these triangles describe the sink basin which has a ceramic material, while some of the triangles describe the faucet, which has a metal material. The sink can be said to have two submeshes, the basin and faucet, each of which contain a multitude of triangles.

A light source projects light into the scene upon nearby mesh surfaces. A light source can be described by its location in three dimensional space, a brightness, and a color. Within the game environment, the material covering each surface has properties governing what proportion of light projected onto it is absorbed, diffused, reflected, and transmitted (in the case of transparent materials).

Each submesh in a game is assigned a material. A material is defined by a color, a texture having a pattern of colors, a bump pattern representing a surface that is not entirely flat, a transparency factor, a diffuse color, a reflectance value, a shininess factor, or any combination of these properties. Source programming code describing the properties of materials is found in the BuildMaterial method in BuildScene.cs, the MaterialData class in Materials.cs, the MaterialData class in MaterialData.cpp, and the AddMaterial method in Document.cpp.

Optionally, the interactive rendering can simulate the effect of default lighting sources upon mesh surfaces within a scene, or can simulate the effect of defined light sources upon mesh surfaces within a scene. Light sources can include direct and diffused light from the sun, as well as artificial lights. For example, an open window would contribute direct and diffused light from the sun, in addition to a table lamp or ceiling mounted light, each of these light sources having varying intensities and colors. A virtual camera is used to approximate the visual experience a viewer would have viewing from within or outside the BIM structure.

The interactive rendering described herein provides for a camera that moves and turns in real-time, in response to input from a user (viewer) of the custom generated interactive rendering program. In effect, the interactive rendering user (viewer) virtually walks through the BIM structure while stopping, turning and changing walking direction in real-time. This sequence of positions is herein referred to as the walking path. The interactive rendering enables the viewer to travel through the BIM structure at walking speed and provides smooth and continuous video like viewing of the BIM structure by rendering images a rate of at least 30 image frames per second. However, unlike a continuous video which is typically entirely pre-made prior to viewing, the path of movement through the BIM structure can be directed in real-time via input from the user (viewer), and as a result, the continuous video is not entirely pre-made but instead finally made (computed) on demand in real time.

Figure 4B:
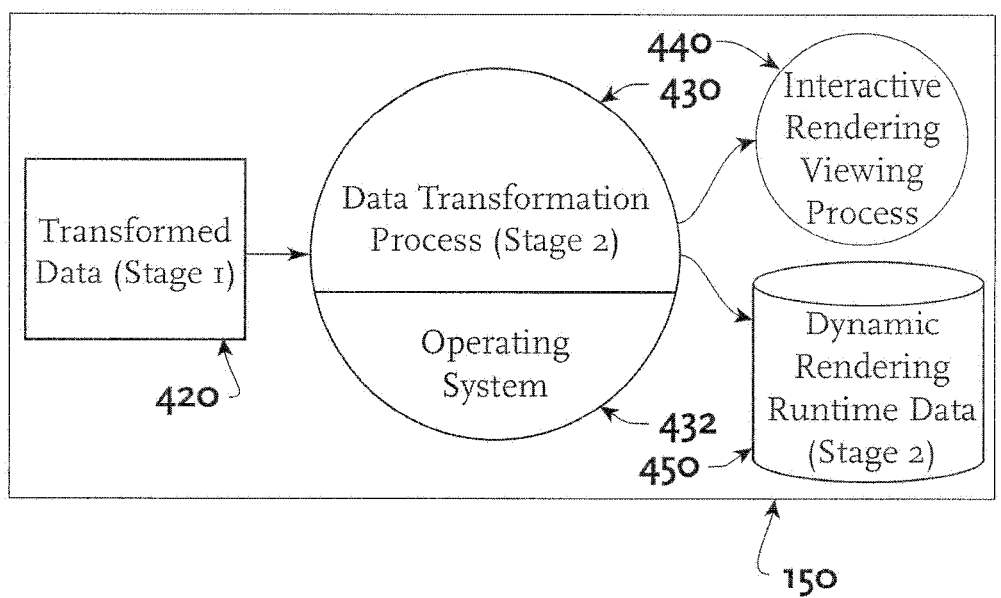

FIG. 4B illustrates a second stage of transformation of the interactive rendering (IR) (extracted) data 390 that was originally obtained from the front end computer 110b. The output of first stage transformed IR data 420 of FIG. 4A in addition to data gathered by the IRIE software 310 is input into a second stage interactive rendering (IR) (extracted) data transformation process 430, also referred to herein as a second stage transformation process 430, which also executes within the interactive rendering computation resource (IRCR) 150.

In this embodiment, the second stage (Stage 2) of the interactive rendering transformation process inputs the .ALI, .DOORS, .CAMERAS, .INFO files 420 and outputs an interactive rendering (IR) viewer program (process) (IRVP) 440 and a set of interactive rendering (IR) data 450, which is also referred to herein as dynamic rendering data or runtime data, to be processed by the IR viewer process 440 during its execution. Optionally, at least some of the IR data 450 is embedded in the IR viewer process 440. Example source programming code for an embodiment of the data transformation (Stage 2) is found in source code file named BuildScene.cs (See Lines 257-404).

Collectively, the first stage 410 and second stage 430 are referred to herein as data transformation performed by a data transformer 410, 430. Note that the data transformer outputs dynamic rendering instructions, which are embedded into the IR viewer process and which access and process the dynamic rendering data in real-time while the viewer is interacting with the IR viewer process 440. Source code for the data transformer is located in association with the ProcessModel function in the BuildScene.cs source programming language file. Files contributing to the creation of an interactive (IR) viewer process 440 contain the information needed to generate a virtual environment corresponding to the building information model (BIM) data originally exported.

The .ALI file contains data describing vertices, triangles referencing the vertices, submeshes referencing triangles, and meshes referencing submeshes. The .ALI file additionally contains natural and artificial light data. The .DOORS file identifies which meshes are functionally doors. The .CAMERAS file describes the name, properties, position and orientation of a viewing camera in three dimensional space. The .INFO file contains information about the project including the building name, architect's name, client's name, geographic position as longitude and latitude in decimal degrees, the desired universal coordinated time (UTC), and date. This information can be used to determine the direction from which sunlight radiates in relation to the structure being modeled. Example source code describing an embodiment of how building information modeling data is transformed, is found within the AliExporter.cpp source code programming language file.

In this embodiment, both the viewer process 440 and the IR runtime data 450 are designed in accordance with a Unity Game Editor supplied by Unity Technologies of San Francisco, Calif. In this embodiment, the Unity game editor (UGE) provides an application programming interface (API) which enables the creation of a game utilizing Unity rendering algorithms and functionality. In this implementation, the second stage IR data transformation process 430 exercises the Unity Game Editor (UGI) application programming interface (API). This implementation reads the .ALI, .DOORS, .INFO, and .CAMERAS, herein referred to as object data, to construct a scene including meshes, lights, cameras, materials, doors etc., herein referred to as objects. and to construct rules defining the behavior of those objects.

Exercising the UGE API causes a set of game accessible data, referred to herein as an asset directory, to be constructed and populated in response to and in accordance with data processed from the input files to the data transformer 410, 430 and further creates the IR viewer process 440 that is constructed in accordance with software supplied by Unity Technologies. The IR viewer process 440 further includes instructions (software) that are designed for processing user input in a manner that is not dependent upon the BIM data 380. The user input is processed in real time to direct navigation (positioning and direction) of a virtual camera located within the virtual three dimensional space defined by the BIM data 380.

In the Windows operating system environment, the asset directory is actually a folder including a set of files. The files within this folder have names suffixed with ".asset", ".png", ".ogg", ".bmp", ".dll" and many others. These files include mesh data, material definitions and data, sound recordings, application behavior and pre-computed light map information. The asset directory is accessible to the IR viewer process 440 during its execution and interaction with the user (viewer) of the IR viewer process 440. Example source code for an embodiment of the interactive rendering viewing process (IRVP) is found in source code file named Motor.cs (See Lines 45-62).

An example of an interactive function employed within a dynamic rendering, is the following. When executing an interactive rendering (IR), some rules limit the movement of the viewing camera. The viewer program allows the viewer to move across floors, up and down stairs, and up or down slopes less than a particular predefined incline. Furthermore, the interactive viewer program prevents the viewer to move through scene geometry, a wall, floor or railing for example, unless that geometry is a door. When a viewer comes within a specific distance of a door, as designed, the door should disappear, then reappear when a user moves away again. In some embodiments, scripts (software procedures and logic) defining such real time behavior of a door, in response to viewer (user) input, are written in C# (C Sharp) and Java. This is an example of the logic, rules and procedures that second stage IR transformation process 430 compiles into at least one dynamic link (.dll file) for later execution by the interactive rendering viewing process (IRVP).

Figure 5A:
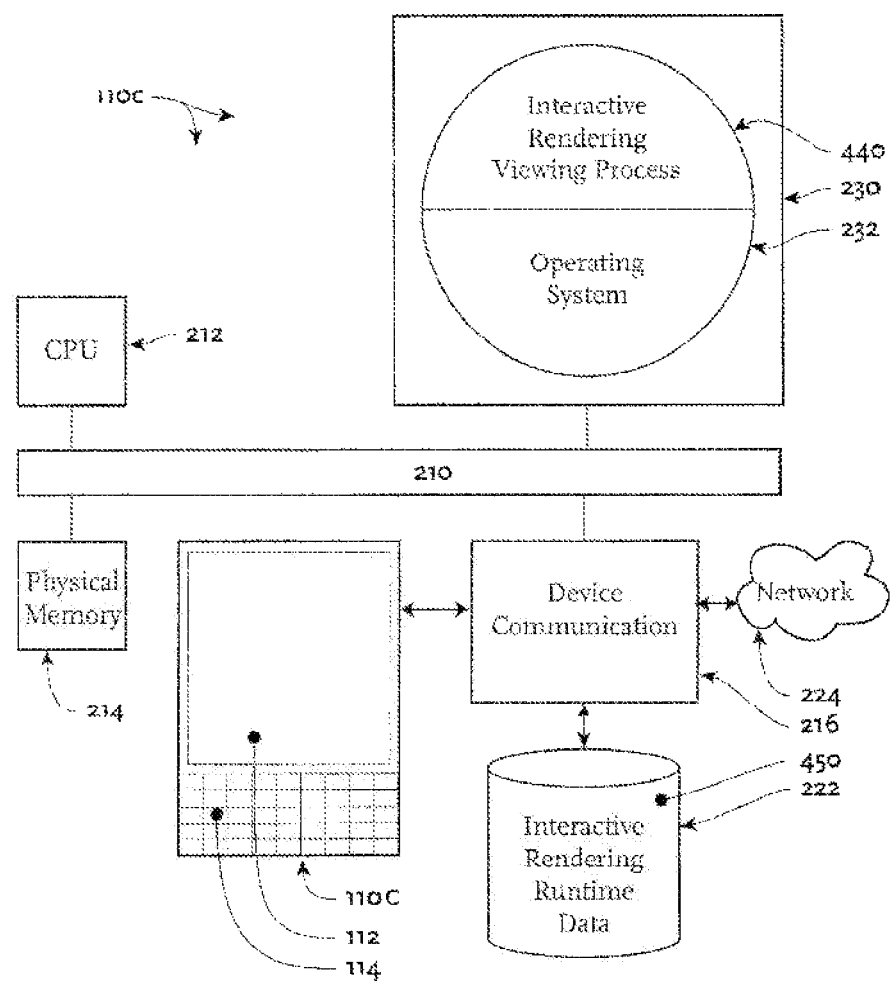
FIGS. 5A-5C illustrate hardware and software of the front end computer 110*c*, and a sample image frame selected from an interactive rendering of BIM data and a lighting effect map associated with the sample image frame.

FIG. 5A is a diagram illustrating a hardware and software of the front end computer 110c, that is now additionally installed with and executing an interactive rendering viewer process (IRVP) 440 and additionally installed with interactive rendering runtime data (IRRD) (dynamic rendering data) 450 that is accessible to the IRVP 440. It is feasible for the IRVP 440 to be executed on the same front end computer as the building information modeling (BIM) process software 234 and IR information extractor (IRIE) 310.

In this embodiment, the IRIE 310 interfaces with the BIM software process as an plug-in, that is also referred to as an add-on component. In other embodiments, it is also an option for the IRVP 440 to be executed on a separate and/or differently configured computation device 110c. The IRVP 440 displays on the screen, in a dynamic (video like) manner, a virtual three dimensional and interactive display rendering environment. The visual content of this interactive display rendering environment approximates a visual experience of walking through a real-world three dimensional space defined by the BIM data 380.

Some visual effects are employed to enhance this viewing experience. For example, in some embodiments, motion blur is used to simulate the exposure time of film cameras. In some embodiments, dynamic range imaging is used to increase the apparent contrast of an image. In some embodiments, anti-aliasing is additionally be used to soften hard edges, also referred to as jaggies.

Figure 5B:
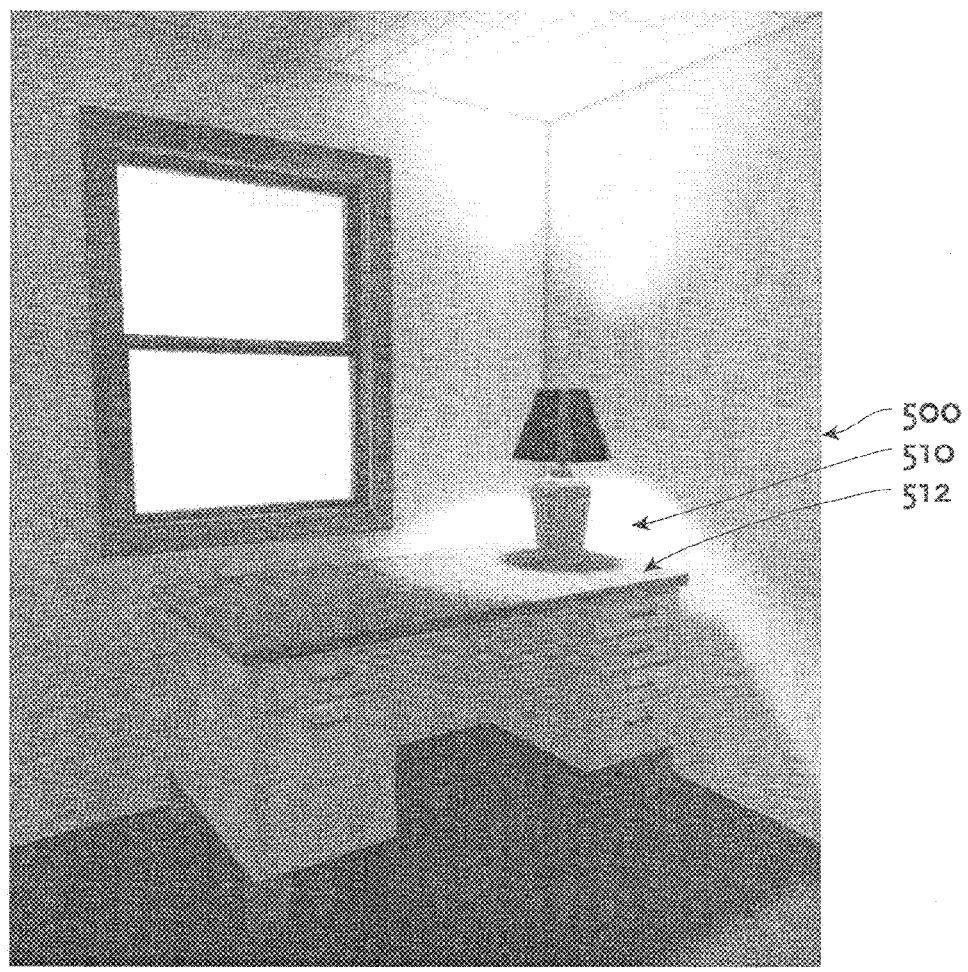

FIG. 5B illustrates a sample image frame that is selected from an interactive rendering of BIM data 380 and that is computed in real-time within the IR viewer process (IRVP) 440. As shown a lamp 510 is sitting atop a desk. Located within the lamp shade is a light source. Light projecting from the light source is defined to have an associated luminosity, intensity and range. The effect of the light projecting onto and reflecting from the mesh surfaces, is simulated and rendered within this image frame 500.

Within this virtual three dimensional environment, the virtual camera, also referred to herein as the viewing camera (not shown), can move forward towards the lamp 510 or backward and farther away from the lamp 510, and/or turn towards the left or right hand direction, and/or rotate up or down. In response to movement of the camera, the game engine will compute and render at least 30 image frames per second in response to movement of the camera during each period of time required to render an image frame (<=1/30 second), and further, each image frame will be different from the prior image frame in response to each separate and different viewing perspective of the viewing camera, and will separately compute the effect of the light source 510 in response each movement of the camera in between each period of time required to render an image frame. Source code describing the movement of the virtual camera as a result of user input is located within the Motor.cs and PositionController.cs source code files.

In other embodiments, depending upon an amount of computing required and depending upon availability and performance of computing hardware, the game engine will compute and render at least 20 frames per second in response to movement of the camera during each period of time required to render an image frame (<=1/20 second), and further, each image frame will be different from the prior image frame in response to each separate and different position and viewing perspective of the viewing camera, and will separately compute the effect of the light source 510 in response each movement of the camera in between each period of time required to render an image frame. Source programming code describing the movement of the virtual camera as a result of user input is located within the Motor.cs and PositionController.cs source code (programming language) files.

In some embodiments, a set of multiple defined textures of varying resolution, collectively referred to as a mipmap, is employed to select and substitute a member of a set of textures rendered to a viewer, based upon a distance of the viewing camera from a particular surface that is associated with the set of textures defined by the mipmap.

In use, the IRVP 440 would render a higher resolution texture of the mipmap set of textures when the associated surface is close to the camera and render a lower resolution texture of the mipmap set of textures when that same associated surface is located farther from the camera. This is also referred to as selective reduction of information based upon proximity of the camera to a particular surface within an interactive rendering scene. Note that if a surface is defined as being made from a transparent material, that surface is invisible and a surface from behind that transparent surface is rendered.

Figure 5C:
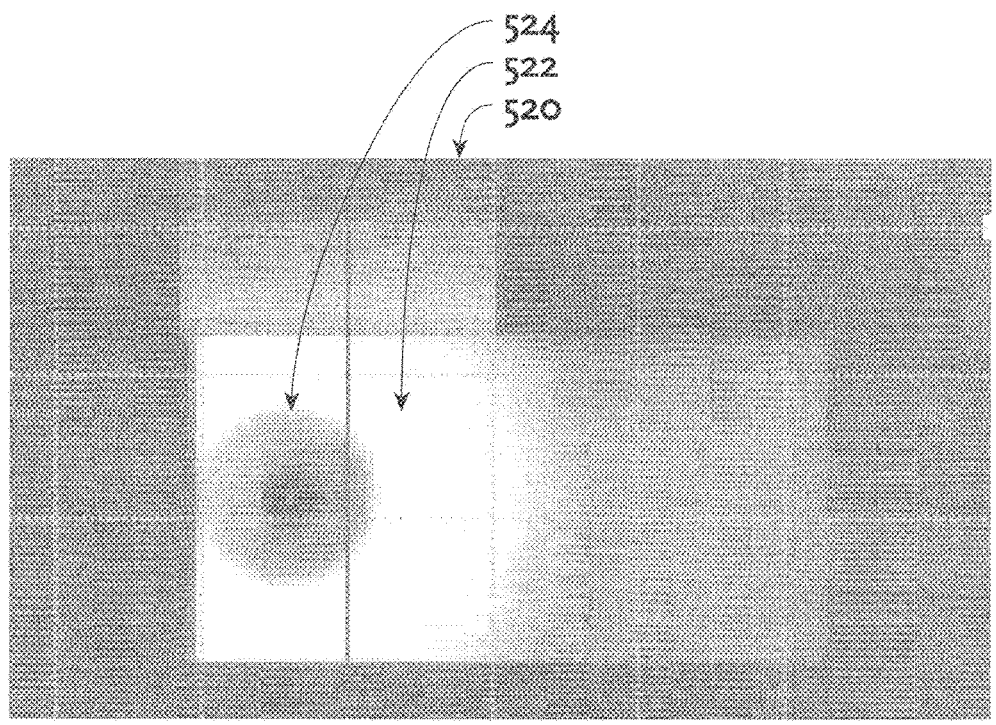

FIG. 5C is a lighting effect map associated with the image frame 500 of FIG. 5B. As shown, the lighting effect map 520 includes a rectangular shaped area 522, representing a lighting effect upon the surface of the rectangular shaped desktop 512 of FIG. 5B. The rectangular shaped area 522 includes varying lighter and darker shaded areas and represents the lighting effect of the lamp 510 upon the surface of the rectangular shaped desktop 512 of FIG. 5B. Within the rectangular shaped area 522 is a circular shaped darker shaded area 524 which represents the lighting effect upon a circular shaped area of the desktop 512 that is located below and surrounding the base of the lamp 510.

Note that a particular light source has many associated attributes that can be factored into computation of a lighting effect map. For example, a light source can have an associated luminous intensity, bulb type, color temperature, hue visual effect and an effective range. These attributes are modeled to compute an effect of a light source on a particular mesh surface. In this embodiment, the lighting effect map is calculated by the interactive rendering computation resource 150, and is stored as an asset within the interactive runtime (dynamic rendering) data 450, and utilized by the interactive rendering viewing process 440. Lighting effect maps are generated by considering both direct illumination, and indirect (reflected) illumination. The results include soft shadows, diffusion of surface color, herein referred to as color bleeding, and the apparent darkening of surfaces near other surfaces, herein referred to as ambient occlusion.

Referring back to FIG. 5B, the image of the top surface of the desktop 512 is computed by the game engine by factoring the material, texture pattern and bump pattern of the mesh surfaces that collectively constitute the top surface of the desktop 512, in combination with the lighting effect map of 520 of FIG. 5C, to arrive at the image of the desktop 512 of FIG. 5B, which is the result of a computed simulation. This computation is performed by what is referred to as a shader procedure. The shader procedure determines how a particular mesh surface will appear "at runtime", meaning how it will appear during a time of execution of the IRVP 440.

Hypothetically, if the lamp 510 were not present in FIG. 5B, the top surface of the desktop 512 would instead appear to be more uniform and like the right hand side of the top surface of the desktop 512. In some embodiments, the lighting effect from an external source of light, such as the solar orientation of the sun is also computed. Source programming code describing how solar orientation is calculated from geographic position, date, and time, is performed by the GetSolarPosition( ) function located within the BuildScene.c source programming language file.

In an embodiment simulating solar orientation, the geographic latitude and longitude, also herein called project geographical co-ordinates, of the building site in terms of decimal degrees, month and day of the year, and universal coordinated time is obtained in order to determine the effect of the position, and expected intensity of the sun on a clear day upon the lighting effects within the structure that is defined by the BIM data 380, also referred to herein as the BIM modeled structure or BIM structure. The sun is a special type of light source, and for the purposes of interactive rendering, it is considered a light source with parallel rays of light impacting the scene uniformly from a direction that is computed based upon the aforementioned parameters Note that solar orientation information is not currently provided within the .FBX file, which has a format specified in accordance with Autodesk Revit software suite. In accordance with the invention, external lighting effects upon the inside and outside of a BIM modeled structure, based upon solar orientation is computed separate from and in parallel with information processed from inside of the .FBX file.

Data extracted from the data defining the BIM structure is often ill suited for efficient computation. This data is translated and optimized for real time rendering in an interactive game model. For example, to translate a light from raw BIM data to game environment data, conversion of position measurements between units of measurements and coordinate systems is performed by the data transformer. Also, conversion of color measurement from degrees Kelvin to a red-green-blue component equivalent is performed by the data transformer 410, 430. Additionally, the maximum practical range of the light source (outside of which it has no effect on scene elements) and an initial brightness is assigned within the data transformation process performed by the data transformer 410, 430.

In another embodiment, the invention is stored as digital logic (such as software or firmware for example) onto a non-transitory computer readable medium carrying one or more sequences of instructions. The medium being a storage device for digital logic, such as for example, a compact disc or a USB memory device. This digital logic is configured to control a computer processor to perform extraction of data from a source of building information model data for use as extracted data for facilitating interactive rendering of the building information model data.

Optionally, this digital logic (software) can further provide transformation of the extracted data into object data representing objects that are useful for visualization and navigation within an interactive rendering environment. Optionally, the digital logic can provide a data transformer that inputs and processes the extracted rendering data and inputs object data and that outputs a set of dynamic rendering instructions and dynamic rendering data for interoperation with an interactive rendering program that is also generated in response to transformation of the extracted data. The dynamic rendering instructions and/or dynamic rendering data can be partially or wholly embedded within the interactive rendering program. The dynamic rendering instructions direct operation of a computing resource for presenting a dynamic rendering to a user, and the dynamic rendering is controlled via real time interaction between the interactive rendering program and said user.

At the time of this writing, a video of a sample IR viewer program can be downloaded from the following uniform resource locator (URL)

http://c461379.r79.cf2.rackcdn.com/fast_company_demo.mov

PARTS LIST 110 front end computers
110a first front end computer
110b second front end computer
110c third front end computer
112 graphic user interface screen
114 input devices
120 first communications channel
130 second communications channel
140 third communications channel 150 interactive rendering computation resource (IRCR)
210 system bus
212 central processing unit (CPU)
214 physical memory
216 device communication hardware
222 stored data
224 communications network
230 virtual memory
232 operating system
234 building information modeling (BIM) software
262 horizontal perspective of first building
272 floor plan of second building
310 interactive rendering information extractor (IRIE)
380 building information model (BIM) data
390 extracted data, interactive rendering (IR) (extracted) data
410 data transformation process (Stage 1), first stage data of transformation, data transformer
420 first stage of transformed data (Stage 1), transformed extracted (IR) data (Stage 1)
430 data transformation process (Stage 2), second stage of data transformation, data transformer
440 interactive rendering viewing process (IRVP)
450 dynamic rendering runtime data (Stage 2), interactive rendering runtime data (IRRD),
500 image frame
510 lamp, light source
512 rectangular shaped desktop
520 lighting effect map
522 rectangular shaped area
524 darker shaded area

The invention claimed is:

1. A system for generating an interactive rendering from building information model data, comprising:
at least one central processing unit that interoperates with other computing hardware;
a data extractor that is configured to control operation of said at least one central processing unit, and via said control, selects and copies building information model data for use as extracted rendering data via said control;
a data transformer that is configured to control operation of said at least one central processing unit, and via said control, identifies portions of said extracted rendering data that constitute objects for visualization and navigation within an interactive rendering environment, and wherein said data transformer generates object data representing said objects;
an interactive rendering program generator that is configured to control operation of said at least one central processing unit, and via said control, inputs said extracted rendering data and said object data and that outputs a set of dynamic rendering instructions and dynamic rendering data for interoperation with an interactive rendering program, and wherein
said dynamic rendering instructions, that are configured to direct operation of a computing resource for presenting a dynamic rendering to a user, said dynamic rendering is controlled via real time interaction between said interactive rendering program and said user.

2. The system of claim 1 including the utilization of one or more network accessible computing resources.

3. The system of claim 2 wherein said interactive rendering program is transmitted from said network accessible computing resources to another computer.

4. The system of claim 2 wherein said building information model data is transmitted from a computer to said network accessible computing resources.

5. The system of claim 2 wherein said building information model data and said interactive rendering program reside on different computers.

6. The system of claim 1 wherein said dynamic rendering is configured to occur at a rate of at more than 20 frames per second.

7. The system of claim 1 wherein said interactive rendering program inputs commands from said user via an input device, and wherein said commands interactively direct said interactive rendering program to dynamically render a walking path through a virtual three dimensional space, said virtual three dimension space being defined by said building information model data.

8. The system of claim 7 wherein said walking path is viewed relative to a virtual camera location that is repositioned in response to said commands in real time and where said location that is repositioned renders a sequence of one or more viewing perspectives in response to said commands.

9. The system of claim 8 wherein said viewing perspectives simulate at least one of, lighting effects and effects of motion blur, of high dynamic range imaging, of anti-aliasing or of depth of field.

10. The system of claim 9 wherein said lighting effects are pre-computed and stored as one or more lighting map textures.

11. The system of claim 9 wherein said lighting effects include at least one of soft shadows, color bleeding and ambient occlusion.

12. The system of claim 1 wherein said interactive rendering program is configured to perform a dynamic rendering of a virtual three dimensional space that incorporates a lighting effect based upon at least one defined source of light.

13. The system of claim 1 wherein said interactive rendering program is configured to perform said dynamic rendering that incorporates an effect of solar orientation upon ambient light within a three dimensional space of said dynamic rendering.

14. The system of claim 4 wherein said dynamic rendering data is stored, at least in part, within a structured file format.

15. The system of claim 14 wherein said structured file format is an Autodesk FBX standard format.

16. The system of claim 14 wherein said structured file format includes serialized data describing doors, lights, project geographical coordinates, project name, client name, solar orientation, time of day and views or materials.

17. The system of claim 1 wherein said data transformer employs a 3dsMax utility program supplied by Autodesk.

18. The system of claim 17 wherein said 3ds Max utility program is operated and extended by a software module utilizing a 3ds Max application programming interface.

19. The system of claim 1 wherein said dynamic rendering is performed using rendering algorithms developed for use in video games.

20. The system of claim 19 wherein said rendering algorithms are in accordance within a Unity game development environment.

21. The system of claim 1 wherein said data transformer employs a Unity Game Editor application programming interface.

22. The system of claim 1 wherein said data extractor operates as a plug-in module into building information modeling software.

23. The system of claim 22 wherein said building information modeling software is a Revit product supplied by Autodesk.

24. An apparatus for generating an interactive rendering from building information model data, comprising:

a data extractor that selects and copies building information model data for use as extracted rendering data;

a data transformer that identifies portions of said extracted rendering data that constitute objects for visualization and navigation within an interactive rendering environment, and wherein said data transformer generates object data representing said objects;

an interactive rendering program generator that inputs said extracted rendering data and said object data and that outputs a set of dynamic rendering instructions and dynamic rendering data for interoperation with an interactive rendering program, and wherein said dynamic rendering instructions direct operation of a computing resource for presenting a dynamic rendering to a user, said dynamic rendering is controlled via real time interaction between said interactive rendering program and said user.

25. A method for generating an interactive rendering from building information model data, comprising the steps of:

providing a data extractor that selects and copies building information model data for use as extracted rendering data;

providing a data transformer that identifies portions of said extracted rendering data that constitute objects for visualization and navigation within an interactive rendering environment, and wherein said data transformer generates object data representing said objects;

providing an interactive rendering program generator that inputs said extracted rendering data and said object data and that outputs a set of dynamic rendering instructions and dynamic rendering data for interoperation with an interactive rendering program, and wherein said dynamic rendering instructions direct operation of a computing resource for presenting a dynamic rendering to a user, said dynamic rendering is controlled via real time interaction between said interactive rendering program and said user.

* * * * *